Figure 1:
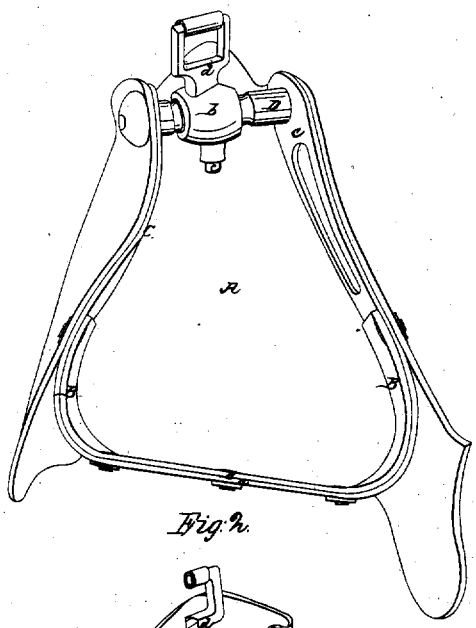

Sheet 1 - 2 Sheets.

R. N. Eagle

Riding Stirrup,

No. 1,759. Reissued Sep. 6, 1864.

Witnesses.
L. S. Robertson
Geo. L. Longan

Inventor
R. N. Eagle
By Thos. P. Howe
Atty.

N. PETERS, PHOTO-LITHOGRAPHER, WASHINGTON, D. C.

Sheet 2-2 Sheets.

R. N. Eagle,

Riding Stirrup,

No. 1,759. Reissued Sep. 6, 1864.

Witnesses.
A. Robud
Chas. J. Lonigan

Inventor
R. N. Eagle
By Thos. G. McL
Atty.

N. PETERS, PHOTO-LITHOGRAPHER, WASHINGTON, D. C.

UNITED STATES PATENT OFFICE.

ROBERT N. EAGLE, OF WASHINGTON, DISTRICT OF COLUMBIA.

RIDING-STIRRUP AND COVER.

Specification forming part of Letters Patent No. 33,930, dated December 17, 1861; Reissue No. 1,759, dated September 6, 1864.

*To all whom it may concern:*

Be it known that I, ROBERT N. EAGLE, of the city of Washington, in the District of Columbia, have invented certain new and useful Improvements in Riding-Stirrups and the Covers for Same; and I do hereby declare that the following is a full and exact description of the same, reference being had to the accompanying drawings, making part of this specification.

This invention consists in, first, so constructing a stirrup as to bring the point of suspension on one side from a line drawn from the center of and near at right angles to the tread, so as to incline the tread of the stirrup inward or outward, toward or from the horse, thereby throwing the foot of the rider involuntarily into position to cause either the knee or the lower part of the leg to embrace the body of the horse; second, in making this inclination adjustable, so as to suit the various circumstances under which it may be used, and the conformation of the riders using it; third, the peculiar manner of constructing the eye and its parts and connecting them to the body of the stirrup so as to give said stirrup such an angular position horizontally and with reference to the body of the horse as to give a ready entrance to the foot without twisting the stirrup-leather, and at the same time permit the easy movement of the foot in the proper directions; fourth, hanging the stirrup upon the horizontal or nearly horizontal axis which passes angularly over the tread in the direction of a line drawn horizontally from the little toe to the instep, as set forth; fifth, the arrangement of the sides or arms in the construction of a stirrup, said sides or arms being carried up in a spiral direction from their base, the outer arm (the longest) being thrown forward with its upper extremity turned inward and toward the rear, and the inner arm brought backward with its upper extremity turned inward and toward the front, in the manner and for the purpose hereinafter more fully described; sixth, constructing the tread of the stirrup with an irregular concavity, so as to conform to the natural convexity of the boot when the foot is bent, the margin of the base of the tread at the great toe being higher relatively than the base at the entrance, while the base at the little toe is the most elevated, as and for the purposes hereinafter described; seventh, the cover for the stirrup hereinafter described, said cover being made of one piece of leather, as described and shown, or its equivalent—such as rubber cloth, canvas, &c.,—the lower portion being turned inward from the bottom to cover the tread and sides, to protect the foot from the weather and the boot from wear or from being passed too far forward through the stirrup; eigthth, a guard applied to the front of the stirrup or stirrup-frame, to prevent the foot passing too far through, or to support the cover or hood, when one is used.

Figure 2:
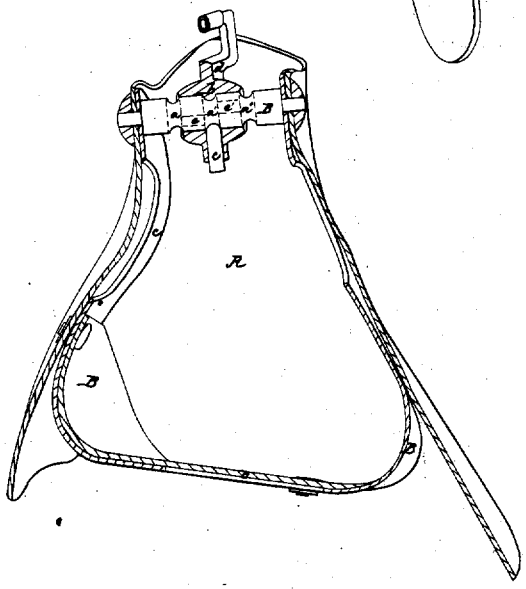
Figure 3:
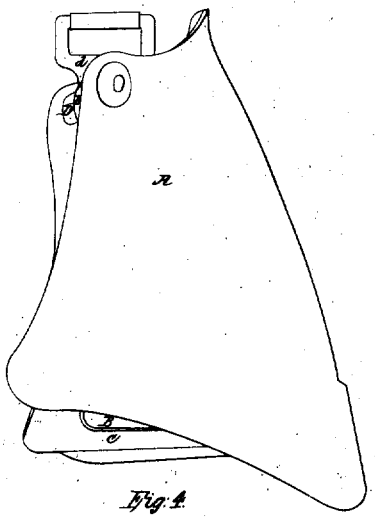
Figure 5:
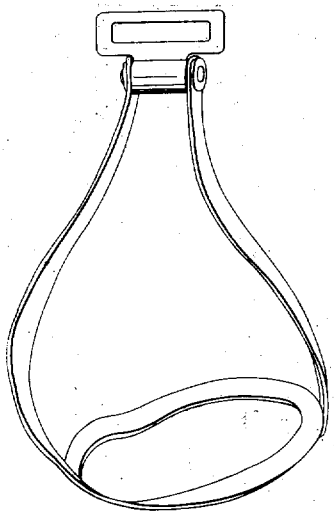
Figure 4:
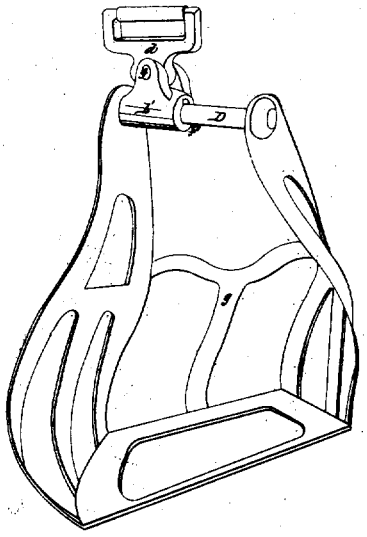
Figure 6:
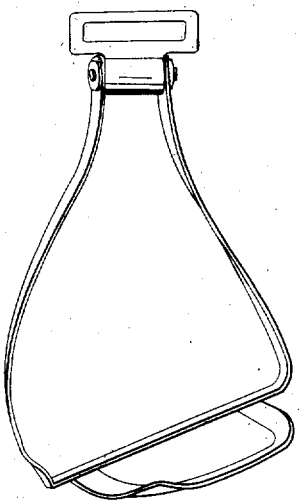

In the drawings, Figure 1 is a back elevation of the right-foot stirrup with the hood or cover attached; Fig. 2, a vertical section of same longitudinally through the axis, and in the central line of suspension; Fig. 3, a side elevation of same; Fig. 4, a perspective view of skeleton stirrup for the left foot. Figs. 5 and 6 are modifications of the above principles.

The present improvements are designed to obviate many inconveniences hitherto existing in the different stirrups commonly in use. From the peculiar construction the tread is either turned inward and upward toward the horse, in order that the lower part of the legs, assisted by the knees, may embrace his sides, and the toes be involuntarily pointed toward his chest, while the heels of the rider are turned out to prevent the spurs from continually galling the animal, and thus insuring a proper, safe, and graceful position on horseback; or else the tread may be turned outward and upward, in order that the knees may be the chief point of contact with the saddle or sides of the animal, which latter mode is also common, and by some riders preferred.

A is the cover; B, the lower part of the cover, turned inward to form the inside lining of the tread and sides, and also a guard to protect the foot both from the weather and from passing too far through the stirrup; C, concave tread of metal, or its equivalent, partly inside and partly outside the cover A; D, the axis, with three grooves, *a a′ a″*, forming different points of suspension by moving the hub *b* of the eye *d* along the axis D, at the same time allowing the stationary pin *c* to pass along and through the slot *e* or *e′* in the axis D.

In Fig. 4 the eye *d* is attached to the hub *b′* by the pin *f*, on which the eye *d* oscillates, and in this case a slot is cut inside and lengthwise of the hub *b'*, by passing which along the axis D and over the stationary pin *f'* the point of suspension is changed. *g* in Fig. 4 represents a bar of metal, wood, or other material, attached at one or more points to the frame of the stirrup by rivets, screws, or other means, and constituting a guard to prevent the toe passing too far through the stirrup. The said guard also affords additional support to the hood or cover, where one is used, and in this case may be attached at its upper end to the material of the said hood. By placing the hub *b* or *b'* at that end of the axis D nearest to the horse a greater degree of angularity of the tread is obtained and a corresponding inclination of the toes inward. The reverse is effected by placing the hub *b* or *b'* at that end of the axis D farthest from the horse.

Some of the advantages attained by the foregoing-described improvements are the following, viz:

First. In the inclination of the tread which adapts itself to the natural position of the foot in clinging with the knees or with the lower parts of the legs, as practiced under different modes of riding.

Second. In the point of suspension graduating this inclination of the tread so as to suit the wants of a recruit, or the requirements of an easy service-stirrup for the constant equestrian, the effect being to incline the inner edge or sole of the boot more or less inward and upward toward the horse, transferring the area of pressure to the entire sole, instead of partially and as heretofore upon the ball of the foot while the leg was stretched, or upon the outer edge of the foot when the leg was bent to embrace the barrel or sides of the horse, this effect being produced as well from an involuntary motion of the rider as from pressure of the feet upon the stirrups. The advantages resulting from the converse of this construction have been already referred to.

Third. In the stirrup turning on axes which allow the heels of the rider to adjust themselves in reference to the height of the toes, and also with its powers of inversion, offering all the advantages of a practical safety-stirrup in insuring the instant disengagement of the foot should the rider happen to be thrown.

Fourth. In the peculiar construction of the eye, which, with its parts, compose a nearly "universal joint," and turning on axes forward and back in line at right angles to each other, but at acute angles to the plane of the horse's side when in use, allow of freer movements for the foot in the proper directions without depriving it at the same time of the necessary support, and which, added to the elevation given to the front part of the marginal base of the tread, prevents the foot pointing too far forward toward the chest of the horse either when the foot is being first inserted or afterward while it is bearing full upon the stirrup, the said effect being produced by the front parts of the marginal base of the stirrup-tread being highest, and consequently the point of contact first offered to the foot, which in finding its bearings must naturally throw the tread, or rather press it, toward the rear, following by the assistance of the eye and its parts in the direction of a line drawn from the little toe to instep.

Fifth. In the shape or economy of the tread, which, being concave, adapts itself to the bend of the foot, affording a bed or hollow, as it were, for the foot, and preventing it from slipping about, as well as in a great measure from being thrust in too far, and, aided by the peculiar suspension of the stirrup, renders it next to impossible that the stirrup could be lost at any gait, provided the leathers were adjusted to a proper length. In explanation of which it may be observed that in the stirrups now used the leathers have to be either lengthened for a stretch of the leg as most convenient in riding at ordinary gaits, or else shortened for a curvature of the limb in adapting it to the rougher ones—such as the "trot out" or in jumping—to insure any assistance from or aid in preserving an equilibrium, or, in fact, to be able to "keep" the stirrup at all, for the reason that the more the leg was bent or drawn up in embracing the horse the longer approximately the straps became, which, being only adjusted to a reach of the leg as measured by the arm of the rider, were nearly useless for more than one purpose or position; Hence the proficient has heretofore depended mainly upon the knees and thighs, which vastly increased the fatigue of riding, whereas with these stirrups, the straps or leathers being measured for adjustment on the short side, the horse is gathered in jumping or the leg composed to a convenient length for "walking" without depriving the foot of its modicum of support, or preventing it from keeping the stirrup in either contingency.

Sixth. In the manner of hanging the stirrup, by reason of the angularity of the eye, which requires no twisting of the strap, but being always unmasked admits of a ready entrance to the foot or recovery of the stirrup by direction of the toes toward the shoulder or forearm of the horse, causing less friction to the leg and wear of the "overalls" of the soldier, in consequence of the leathers not coming into contact with the legs below the knee, except in gathering the horse, the flat of the strap only touching, and the buckle being inside and next the horse.

Seventh. Accidental spurring of the horse is obviated by this stirrup keeping the feet nearly parallel to the horse's sides and inclining the toes in, instead of forcing them out, and, when suspended at a point nearest the horse, causing such constraint as ultimately to render this position most natural to the rider. The more pressure that is thrown upon the stirrup, and the higher the point of suspension used, the more positively is the effect produced.

Eighth. These stirrups are intended to exercise the ankle, as the "moulinet" with the saber does the wrist, and to train all riders, whether they are "bowed" or "knocked" in the conformation of their legs and knees. The physical conformation of the former, offering less resistance to a secure seat in the saddle, would require a less acute angle of deflection, whereas riders of the latter class, of course, a greater degree in order to overcome the difficulty of bringing their legs in quick enough under emergencies to embrace the barrel or sides of the horse.

Ninth. The interlocking of feet rendering the trooper liable to be unhorsed by a heavier adversary, or when at speed, as in the "charge," to the not uncommon casualty of having the foot twisted out, if not the leg broken, is in a great measure avoided, while the advantage must be as obvious in the increased facilities offered for moving "boot to boot" in column or close masses.

The guard *g* and other parts of the above-described invention are equally applicable to stirrups of wood, metal, or other material.

What I claim as my invention, and desire to secure by Letters Patent, is—

1. The locating of the point of suspension inside or outside of a vertical line which is drawn from near the center of and at right angles to the tread of the stirrup, substantially as set forth.

2. Making this inclination adjustable by the sliding hub or its equivalent, so as to suit the different circumstances under which it may be used or the conformation of the user, substantially as described.

3. The peculiar angular construction of the eye, and the manner of its attachment to the body of the stirrup, so as to impart to the tread of said stirrup an angular position horizontally, and also with reference to the body of the horse, thus allowing an easy entrance to the foot without twisting the stirrup-leather, and causing at the same, time the foot to move in the proper directions, substantially as set forth.

4. Hanging the stirrup upon the horizontal or nearly horizontal axis, which passes angularly over the tread in the direction of a line drawn horizontally from the little toe to the instep, substantially as set forth.

5. Constructing the sides or arms of a stirrup in a spiral form with the inner side or arm shorter than the outer side or arm, so as to compel the toes and foot of the rider to turn inward toward the body of the horse, substantially as described.

6. Constructing the tread or marginal base of the stirrup with an irregular concavity in order to conform to the bend of the foot or boot, and with the front of said marginal base of the tread higher relatively than the base at the entrance of the stirrup, as and for the purposes described.

7. The cover of the stirrup, said cover being made of one piece, the lower portion being turned inward from the bottom to cover the tread and lower part of sides, thus forming a guard and protection for the foot, substantially as set forth.

8. A guard or bar, *g*, to be applied to the front of the stirrup or stirrup-frame to prevent the foot from passing too far through, or to serve as a support for the cover, where one is used.

R. N. EAGLE.

Witnesses:
OCTAVIUS KNIGHT,
EDWARD H. KNIGHT.